No. 639,606. Patented Dec. 19, 1899.
J. D. OLINGER.
TRAP.
(Application filed Aug. 4, 1899.)
(No Model.)
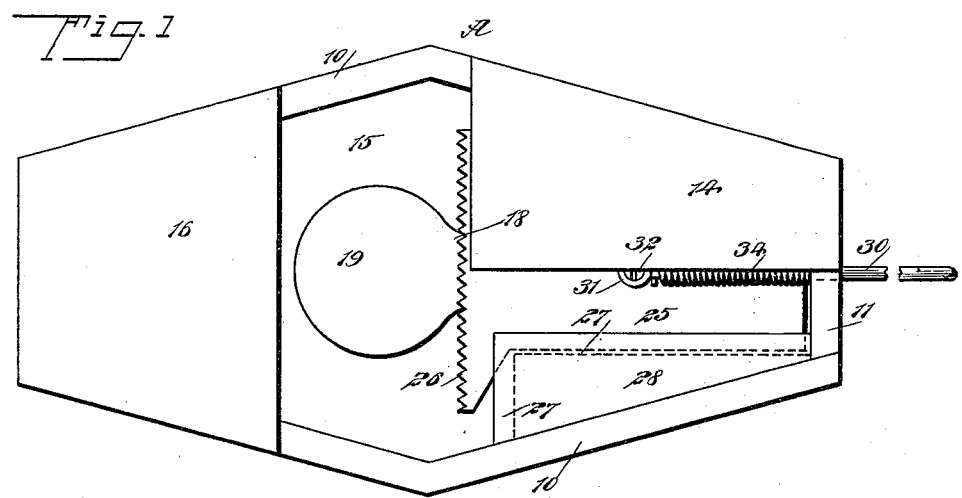

UNITED STATES PATENT OFFICE.

JOHN DANIEL OLINGER, OF FINCASTLE, KENTUCKY.

TRAP.

SPECIFICATION forming part of Letters Patent No. 639,606, dated December 19, 1899.

Application filed August 4, 1899. Serial No. 726,127. (No model.)

*To all whom it may concern:*

Be it known that I, JOHN DANIEL OLINGER, of Fincastle, in the county of Lee and State of Kentucky, have invented a new and useful Improvement in Traps, of which the following is a full, clear, and exact description.

The object of my invention is to provide a simple, economic, and effective trap for large or for small game, which may be easily and quickly set, and which when sprung will securely hold the captive.

Another object of the invention is to so construct the improved trap that the captured animal cannot use its teeth to release itself, since means are provided whereby the impaled member cannot be reached by the animal's mouth.

A further object of the invention is to so construct the trap that a touch upon the trigger will be sufficient to cause the sliding jaw to be immediately released and forced to a retaining engagement with the object upon the trigger.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved trap set. Fig. 2 is a longitudinal vertical section taken through the central portion of the trap with its trigger set. Fig. 3 is a view similar to Fig. 2, the trigger having been sprung; and Fig. 4 is a transverse section.

The casing A of the trap may be of any approved form. In the drawings, however, it is shown of diamond or coffin-like shape. The said casing may be made of any desired material and comprises vertical closed sides 10, vertical closed ends 11, and a bottom 12, together with a transverse partition 13, located within the casing and extending from side to side at a point between the center and one end. The space between the opposite end of the casing and the partition 13 is partially covered by a top plate or board 14, a portion only of which is shown in Fig. 1, and a transverse opening 15 is provided at the top of the casing, between the top board or plate 14 and the partition 13. This opening is for the purpose of permitting an animal to tread upon a trigger, to be hereinafter described. The opposite end of the casing is closed by a cover 16, that is attached not only to the end member of the casing, but likewise to the partition 13. It will be understood, however, that as far as the construction of the casing is concerned it may terminate at the partition 13.

A bearing 17 is secured upon the bottom 12 of the casing beneath the cover board or plate 14, and this bearing 17 is practically U-shaped in cross-section, comprising spaced sides and a bottom connecting the sides. A lever 18 is fulcrumed between the sides of the bearing 17 at its inner end, and the inner end portion of the lever 18 is in the shape of a circular trigger 19, which extends into the open space 15 of the casing, as shown in Fig. 1. The upper surface 20 of the outer end of this trigger-lever 18 is inclined from the top downwardly and outwardly, as shown in Figs. 2 and 3, and the trigger-lever operates in conjunction with a latch-lever 21, also fulcrumed between the sides of the bearing 17; but the fulcrum of the latch-lever is at a point higher than the point of the trigger-lever. The inner end 22 of the latch-lever is beveled from the top downwardly and outwardly to meet the correspondingly-beveled surface of the trigger-lever, and when these two surfaces are in engagement the trigger 19 will be horizontal and the latch-lever will have an upward and outward inclination, as shown in Fig. 2, being held at such inclination by means of a spring 24, which bears against the under surface of the latch-lever at its outer end. At the upper face of the latch-lever, near its outer end, a shoulder 23 or a projection or its equivalent is formed.

A retaining-jaw 25 operates in conjunction with the trigger and latch levers. The inner end of the jaw 25 is much wider than its other portion and is provided with teeth 26 of any desired character. The retaining-jaw 25 is adapted to slide in grooves 27, that extend longitudinally and horizontally in the inner side faces of blocks 28 and in the inner end faces of said blocks, as shown in dotted lines in Fig. 1, and these blocks or guides 28 are made to fit against the sides of the casing beneath the cover plate or board 14, one at each side of the bearing 17. Braces 29 are usually located between the said bearing and the said guide-blocks, as shown in Fig. 4. The grooves 27 in the inner end portions of the guide-blocks are made deep enough to accommodate the widened inner portion of the retaining-jaw when it is drawn backward or set.

The retaining-jaw is provided with a recess $29^a$ in its under face, and when said retaining-jaw is drawn outward or back to be set, as shown in Figs. 1 and 2, the shoulder 23 or offset of the latch-lever will enter the said recess $29^a$ and normally hold the retaining-jaw in its set position.

A handle-bar 30 is loosely passed through an end of the casing, and at the inner end of the handle-bar 30 an enlargement 31 is formed, secured to the upper face of the retaining-jaw at its center by a screw 32 or its equivalent, and a crank-arm 33 is formed at the outer end of the handle-bar. A spring 34 is coiled around the handle-bar, having bearing against a suitable offset adjacent to the enlargement 31 and likewise against the inner face of the end of the casing through which the handle-bar is passed. The retaining-jaw 25 is drawn outward or backward to its set position through the medium of the handle-bar, and when the retaining-jaw is set the spring 34 is placed under tension, as shown in Figs. 1 and 2.

In operation the moment the animal places a member of its anatomy on the trigger 19 of the lever 18 the said trigger is carried downward and the lever end upward, thus forcing the inner end of the latch-lever likewise upward and its outer end downward, as shown in Fig. 3, and at this movement of the latch-lever it is released from the retaining-jaw, whereupon the spring 34 on the handle-bar 30 immediately acts to force the retaining-jaw inward or in direction of the partition 13 and will hold that member of the animal placed on the trigger firmly against the said partition through the medium of the teeth 36 at the inner end of said retaining-jaw.

This trap is exceedingly simple, durable, and economic and may be set by any person of ordinary strength. Furthermore, it is capable of being quickly set and quickly sprung. The construction of the trap is also such that when a leg of an animal, for example, is held by the retaining-jaw it will be impossible for the animal to reach the leg or the toes for the purpose of gnawing the same and effecting its escape.

Having thus described my invention, I claim as new and desire to secure by Letters Patent—

1. In a trap, a casing having its sides, ends, and bottom closed, and a portion of its top closed, a jaw mounted to slide horizontally within the casing, a spring controlling the movement of the jaw in one direction, the said spring being also located within the casing, a latch-lever arranged in locking engagement with the said jaw, a second lever arranged to trip the latch-lever, both of said levers being located within the casing and below the jaw, the tripping-lever being provided with a trigger arranged below the opening in the top of the casing.

2. In a trap, a casing having its sides, ends and bottom closed, a jaw mounted to slide horizontally in the said casing, a partition in direction of which the jaw travels, a spring controlling the movement of the jaw in one direction, a latch-lever arranged for locking engagement with the said jaw, and a second lever arranged to trip the latch-lever and provided with a trigger over which the jaw is adapted to move, the pivotal point of the latch-lever being above the pivot of the trigger-carrying lever, as specified.

3. In a trap, the combination, with a casing, a jaw held to slide in said casing, having a keeper at its bottom surface, a handle-bar attached to the said jaw and extending out through the casing, and a spring coiled around the handle-bar within the casing, having bearing at one end against a portion of the said bar and at its opposite end against a fixed object, of a latch-lever arranged for direct locking engagement with the keeper of the jaw, a spring for normally maintaining the latch-lever in position to lock with the jaw, a trigger over which the jaw is arranged to slide, and a lever constituting a portion of said trigger and arranged when the trigger is depressed to force the latch-lever from locking engagement with the sliding jaw, as described.

JOHN DANIEL OLINGER.

Witnesses:
J. H. EVANS,
JOHN SIZEMORE.